United States Patent
Narahara et al.

(10) Patent No.: US 6,292,266 B1
(45) Date of Patent: Sep. 18, 2001

(54) PRINTING APPARATUS WITH FACSIMILE FUNCTION

(75) Inventors: Shuji Narahara; Shinji Katsuyama, both of Kurume; Naoyuki Matsuda, Ogori, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/444,062

(22) Filed: May 18, 1995

(30) Foreign Application Priority Data

Jun. 30, 1994 (JP) .................................................... 6-149236

(51) Int. Cl.⁷ ...................................................... B41B 2/01
(52) U.S. Cl. ............................................ 358/1.13; 358/440
(58) Field of Search .................................... 395/101, 106, 395/109, 110, 112, 114; 358/440, 468, 444, 448; 382/175, 317

(56) References Cited

U.S. PATENT DOCUMENTS

| 4,910,607 | * | 3/1990 | Uita et al. | 358/448 |
| 4,947,345 | * | 8/1990 | Paradise et al. | 358/442 |
| 5,021,892 | * | 6/1991 | Uita et al. | 358/444 |
| 5,371,574 | * | 12/1994 | Ohmura et al. | 355/208 |
| 5,448,378 | * | 9/1995 | Matsumoto | 358/434 |

FOREIGN PATENT DOCUMENTS

| 63212557A | 9/1988 | (JP) . |
| 5122429A | 5/1993 | (JP) . |
| 529233A | 11/1993 | (JP) . |

\* cited by examiner

Primary Examiner—Gabriel I. Garcia
(74) Attorney, Agent, or Firm—Stevens, Davis, Miller & Mosher, LLP

(57) ABSTRACT

A printing apparatus includes a facsimile data receiving unit for receiving a reception request signal and print data which are transmitted through a telephone line; a computer data receiving unit for receiving print data transmitted through a line different from a telephone line; a printing unit for printing each of the print data received by the facsimile data receiving unit and the computer data receiving unit on a medium; and a mode setting unit for selectively setting a first mode in which, when the facsimile data receiving unit receives the reception request signal and the printing unit is printing the print data received by the computer data receiving unit, the printing process of the computer data is interrupted thereby allowing the printing unit to execute a printing operation of the print data from the facsimile data receiving unit in accordance with the reception request signal, and a second mode in which when the facsimile data receiving unit receives the reception request signal and the printing unit prints the print data received by the computer data receiving unit, the reception request is reserved thereby allowing the printing unit to continue the printing operation of the computer data. The second mode is automatically changed to the first mode when printing of the computer data is completed.

6 Claims, 2 Drawing Sheets

PRINTING APPARATUS WITH FACSIMILE FUNCTION

BACKGROUND OF THE INVENTION

The invention relates to a printer having a receiving function of a facsimile and printing data outputted from an electronic equipment such as a personal computer.

There has existed a printer with a facsimile operation which is connected to a personal computer and which not only prints character data or image data from the personal computer but also functions as a facsimile apparatus. In association with the realization of low prices in recent years, such printer is generally widespread. In such printer with a facsimile operation, various improvements have been performed so that facsimile data can be received even during the printing operation of computer data from the personal computer.

First, the first conventional example will now be described. A printer with a facsimile operation disclosed in JP-A-63-212557 is constructed in a manner that when a facsimile signal is received during the reception of data from a personal computer, a receiving operation of an interface control with the personal computer is interrupted and a receiving operation of an interface control with the facsimile is executed. In such a construction, however, since a printing operation can be stopped and the operation can be immediately shifted to the facsimile reception mode, a purpose to give a priority to output of facsimile data can be realized. However, since the printing operation is actually accompanied with other operations such as delivery of a paper in the halfway of the printing, the stop of printing is not effective.

The second example will now be described in consideration of such processes. According to a printer disclosed in JP-A-5-292233 and JP-A-5-122429, when a facsimile signal is received during reception of data from a personal computer, the print-data from the personal computer is printed by an amount of one sheet and the sheet is delivered out and, after that, the printer starts printing on a next sheet.

In the above second conventional example, however, since the data from the facsimile through telephone line is always preferentially printed, if there is a facsimile reception while urgent important data is received from the personal computer and is printed, the data printing from the personal computer is stopped in the halfway or the printing of up to the sheet that is at present being printed is interrupted and then the printing of the facsimile reception data is started.

SUMMARY OF THE INVENTION

It is, therefore, an object of the invention to solve the problem of the conventional examples as mentioned above and to provide an easy-to-use printing apparatus in which a printing operation of particularly urgent and important computer data is performed, a facsimile interruption inhibit mode can be set.

According to the invention, there is provided a printing apparatus comprising: facsimile data receiving means for receiving a reception request signal and print data which are transmitted through a telephone line; computer data receiving means for receiving print data that is transmitted through a line different from the public telephone line; printing means for printing each of the print data received by the facsimile data receiving means and the computer data receiving means on a medium; and mode setting means for selectively setting either one of a first mode in which when the facsimile data receiving means receives a reception request signal and the printing means is printing the print data received by the computer data receiving means, the printing operation of the computer data is interrupted, thereby allowing the printing means to execute the printing operation of the print data from the facsimile data receiving means in accordance with the reception request signal, and a second mode in which when the facsimile data receiving means receives the reception request signal and the printing means is printing the print data received by the computer data receiving means, the reception request is reserved, thereby allowing the printing means to continue the printing operation of the computer data.

There is provided second mode control means, including detecting means for detecting an end of the computer data printing operation and third control means for controlling the mode selecting means so as to select first mode control means on the basis of a detection result of the detecting means, thereby automatically returning the operation to the first mode.

The apparatus further includes facsimile data temporary storing means for receiving and storing the facsimile data when there is a facsimile data reception request and the second mode control means is selected; and reading means for reading out the data stored in the facsimile data temporary storing means and for transmitting the read data to the printing means, wherein after the computer data was printed, the facsimile data is printed.

DESCRIPTION OF THE PREFERRED EMBODIMENTS

Figure 1:
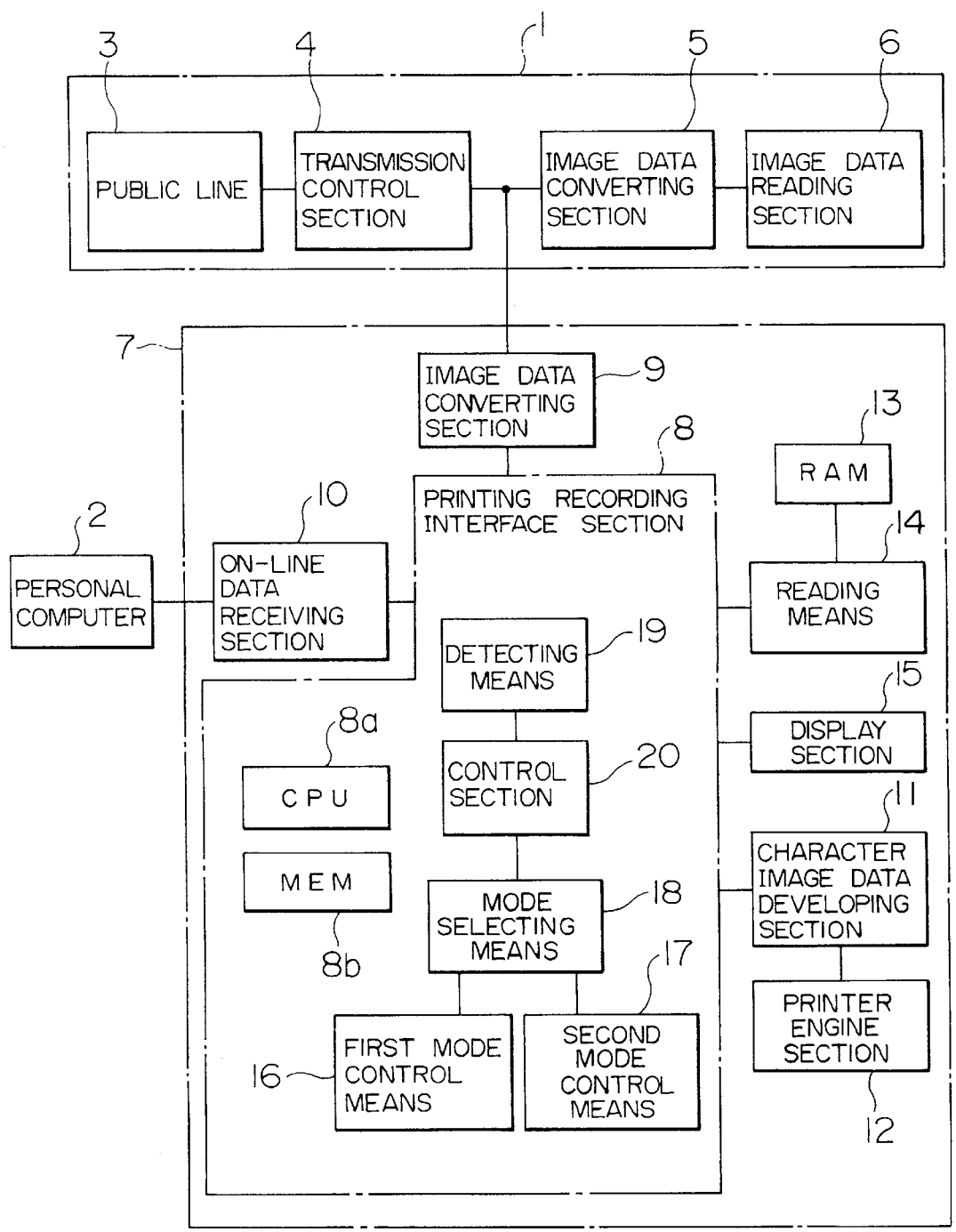
FIG. 1 is a schematic functional block diagram illustrating an arrangement of a functional composing elements of in an embodiment of the present invention.

An embodiment of the invention will now be described with reference to the drawings. FIG. 1 is a schematic functional block diagram illustrating an arrangement of functional composing elements according to the invention. In the figure, reference numeral 1 denotes a facsimile apparatus for transmitting and receiving image and character data through a public telephone line 3; and 2 denotes a personal computer (hereinafter, referred simply to as a "computer") for transmitting character data and image data.

The facsimile apparatus 1 connected to the public telephone line 3 comprises a transmission control 4, an image data converter 5, and an image data reader 6, which are mutually connected in this order. The public telephone line 3 is used for facsimile communication. The transmission control 4 executes a transmission operation and a communication control for facsimile transmission and reception and has a function as facsimile data receiver. The image data converter 5 converts image and character data read by the image data reader 6 to data for transmission via a communication line. The image data reader 6 reads original documents to be facsimile transmitted.

Reference numeral 7 denotes a recording apparatus. The recording apparatus 7 comprises: a printing recording interface 8; an image data converter 9 and a computer data receiver 10 which are respectively connected to the printing recording interface 8; a character image data developer 11; a printer engine 12 connected to the character image data developer 11; an RAM 13 to temporarily store received facsimile data; and reader 14 for reading or writing the facsimile data recorded in the RAM 13. A display 15 to display information regarding a printing state is also provided for the printing recording interface 8.

The printing recording interface 8 controls a communicating state with the facsimile apparatus 1 and a receiving state of on-line data (hereinafter, referred to as computer data) from the computer 2, and further select data from the facsimile apparatus 1 and data from the computer 2 as recording data. The printing recording interface 8 includes first mode control 16 in which when a facsimile data reception request is generated (a reception request signal is received) during reception of computer data and printing operation of data, the reception of the computer data and the data operation are interrupted and a reception of facsimile data and a printing operation are executed; second mode control 17 in which when a facsimile data reception request is generated (the reception request signal is received) during reception of the computer data and the printing operation of the data, reception of the facsimile data and a printing operation are reserved and the reception of the computer data and a data process are continued without interruption; mode selector 18 for enabling the first mode control 16 and second mode control 17 to be selected; detector 19 for detecting the reception of the computer data and a processing situation; and a controller 20 for controlling the mode selector 18 so as to allow the mode selector to select from the second mode control 17 the first mode control 16 when the detector 19 detects an end of the computer data receiving operation during setting of a second mode.

Figure 2:
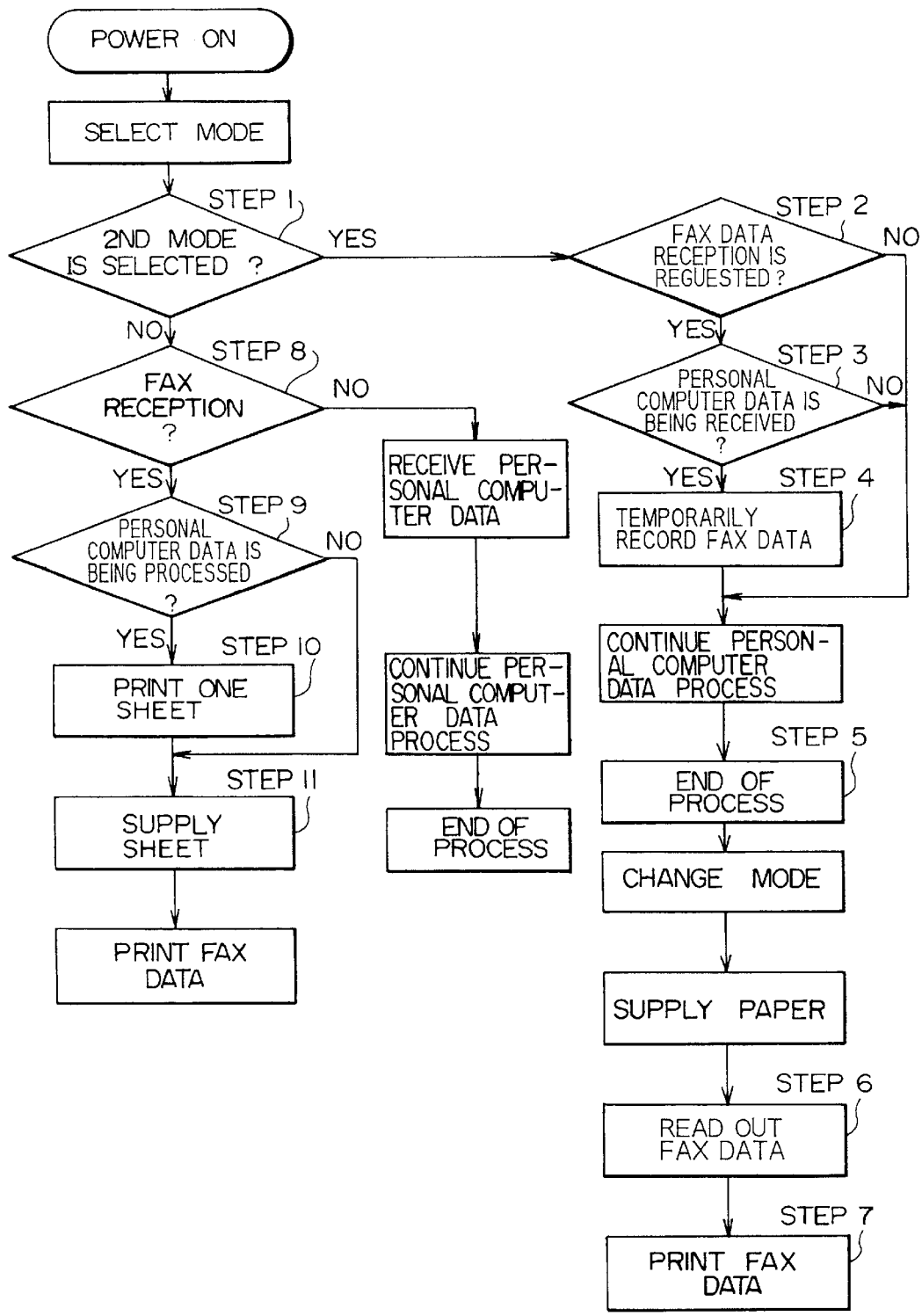
FIG. 2 is an interruption flowchart when a call signal appears on a public telephone line of the printer in the embodiment of the present invention.

The printing recording interface 8 has a processor 8a (hereinafter, referred to as "CPU") for executing an operation as shown in FIG. 2, and performing a control operation, and a memory 8b (hereinafter, referred to as "MEM") for recording its control means. The image data converter 9 is connected between the transmission control 4 and the image data converting 5 of the facsimile apparatus 1 and converts the data received from the facsimile apparatus 1 to image recording data. The computer data receiver 10 is connected to the computer 2 and receives character and image data from the computer 2. The character image data developer 11 develops the character data to bit map data and sends it to the printer engine 12.

The printer engine 12 executes electrophoto-graphic processes such as exposure, development, transfer and fixing in order to print the character data and image data developed by the character image data developer 11 and also executes a sheet paper conveyance. A sheet paper conveying speed is equal to four sheets/minute. The display 15 displays a printing operation of the printer engine 12.

The operation of the printer constructed as mentioned above will now be described with reference to a flowchart of FIG. 2. FIG. 2 is an interruption flowchart in which a call signal appears on a public telephone line of the printer with a facsimile operation according to the invention. After a power source was turned on, in step 1, the selector 18 selects a second mode in which when a reception request signal of facsimile data is received during a reception of the computer data from the computer 2, the facsimile data process is preserved and a computer data process is continued. When there is a reception of the reception request signal of facsimile data in step 2, the processing routine advances to step 3. It is decided whether the computer data from the computer 2 is being received or not. When it is decided that the computer data is being received, in step 4 the facsimile data is temporarily recorded in the RAM 13. On the other hand, the computer data receiving process is continued without being interrupted, the computer data is printed on a sheet of paper, and the sheet of paper is delivered out of the apparatus. In this manner, the computer data process is finished.

In step 5, when the detecting means 19 subsequently detects the end of the computer data process, the mode selector 18 is controlled by the control 20, the first mode control 16 is selected, and the control mode is changed from the second mode to the first mode and is set.

In step 6, the facsimile data which was once stored in the RAM 13 is read out by the reader 14 and is printed in step 7.

When the first mode is selected in step 1 and when there is a reception of the facsimile data reception request signal in step 8, it is decided in step 9 whether the computer data from the computer 2 is at present being received or not. When it is decided that the computer data is being received, the apparatus stands by until the printing of the sheet now being printed is finished in step 10. When the printed sheet is delivered, a facsimile printing sheet is fed in step 11 and the facsimile data (print data) is printed.

According to the embodiment as constructed above, when urgent important data is printed, by setting the mode to the second mode, even if a facsimile data reception request is generated during the printing operation, the printing operation of the important data is continued without being interrupted. Since the facsimile data is once received and stored in the memory, the facsimile data is printed and outputted after completion of the printing operation of the important data. Consequently, the facsimile reception is performed without causing any trouble.

What is claimed is:

1. A printing apparatus comprising:

first data receiving means for receiving a reception request signal and first print data which are transmitted through a first line;

second data receiving means for receiving second print data that are transmitted through a second line different from said first line;

printing means for printing each of the first and second print data on a medium;

mode setting means for selectively setting a first mode in which when said first data receiving means receives the reception request signal and said printing means prints the second print data received by said second data receiving means, the printing operation of said second data is interrupted, thereby allowing said printing means to execute a printing operation of the first print data from said first data receiving means in accordance with said reception request signal, and a second mode in which when said first data receiving means receives said reception request signal and said printing means prints the second print data received by said second data receiving means, said reception request is reserved, thereby allowing said printing means to continue the printing operation of said second data; and control means for performing a control operation, such that when said second mode is set, said mode setting means automatically switches from said second mode to said first mode after completion of the printing of the second data.

2. An apparatus according to claim 1, further comprising detecting means for detecting an end of a second data printing process when said second mode is set, and mode change control means for controlling said mode setting means such that said mode setting means automatically sets said first mode on the basis of a detection result of said detecting means.

3. An apparatus as in claim 2, further comprising first data temporary storing means for receiving and storing the first data in the event that there is a reception request signal when said second mode is set, and reading means for reading the first data from said first data temporary storing means on the basis of the detection result of said detecting means and for outputting the read data by said printing means.

4. A printing apparatus comprising:

facsimile data receiving means for receiving a reception request signal and print data which are transmitted through a telephone line;

computer data receiving means for receiving print data that are transmitted through a line different from said telephone line;

printing means for printing each of the print data received by said facsimile data receiving means and said computer data receiving means on a medium;

mode setting means for selecting either one of a first mode in which when said facsimile data receiving means receives the reception request signal and said printing means prints the print data received by said computer data receiving means, the printing operation of said computer data is interrupted, thereby allowing said printing means to execute a printing process of the print data from said facsimile data receiving means in accordance with said reception request signal, and a second mode in which when said facsimile data receiving means receives said reception request signal and said printing means prints the print data received by said computer data receiving means, said reception request is reserved, thereby allowing said printing means to continue the printing process of said computer data; and control means for performing a control operation such that when said second mode is set, said mode setting means automatically switches from said second mode to said first mode after completion of the printing of the computer data.

5. A printing apparatus comprising:

facsimile data receiving means for receiving a reception request signal and print data which are transmitted through a telephone line;

computer data receiving means for receiving print data that are transmitted through a line different from said telephone line;

printing means for printing each of the print data received by said facsimile data receiving means and said computer data receiving means on a medium;

mode setting means for selectively setting a first mode in which when said facsimile data receiving means receives the reception request signal and said printing means prints the print data received by said computer data receiving means, the printing operation of said computer data is interrupted, thereby allowing said printing means to execute a printing operation of the print data from said facsimile data receiving means in accordance with said reception request signal, and a second mode in which when said facsimile data receiving means receives said reception request signal and said printing means prints the print data received by said computer data receiving means, said facsimile reception request is reserved, thereby allowing said printing means to continue the printing process of said computer data;

detecting means for detecting an end of the computer data printing process when said second mode is set; and mode change control means for controlling said mode setting means in a manner that said mode setting means automatically sets said first mode on the basis of a detection result of said detecting means.

6. An apparatus according to claim 5, further comprising:

facsimile data temporary storing means for receiving and storing the facsimile data in the event there is a reception request signal when said second mode is set; and reading means for reading the data from said facsimile data temporary storing means on the basis of the detection result of said detecting means and for outputting the read data by said printing means.

* * * * *